(12) United States Patent
Johnson et al.

(10) Patent No.: US 11,978,036 B2
(45) Date of Patent: May 7, 2024

(54) DIRECTIONAL RADIO FREQUENCY IDENTIFICATION SYSTEM

(71) Applicant: Toshiba Global Commerce Solutions Holdings Corporation, Tokyo (JP)

(72) Inventors: Brad Matthew Johnson, Raleigh, NC (US); David J. Steiner, Durham, NC (US); Kimberly A. Wood, Raleigh, NC (US); Timothy W. Crockett, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 49 days.

(21) Appl. No.: 17/702,609

(22) Filed: Mar. 23, 2022

(65) Prior Publication Data
US 2023/0306409 A1    Sep. 28, 2023

(51) Int. Cl.
| | |
|---|---|
| *G06Q 20/32* | (2012.01) |
| *G06K 7/10* | (2006.01) |
| *G06Q 20/20* | (2012.01) |
| *G06Q 30/04* | (2012.01) |

(52) U.S. Cl.
CPC ..... *G06Q 20/3278* (2013.01); *G06K 7/10099* (2013.01); *G06K 7/10376* (2013.01); *G06Q 20/208* (2013.01); *G06Q 30/04* (2013.01)

(58) Field of Classification Search
CPC ........... G06K 7/10079; G06K 7/10376; G06K 7/10099; G06Q 20/3278
See application file for complete search history.

(56) References Cited

U.S. PATENT DOCUMENTS

| | | | | |
|---|---|---|---|---|
| 6,127,938 | A * | 10/2000 | Friedman | G07B 15/063 |
| | | | | 340/904 |
| 6,946,950 | B1 * | 9/2005 | Ueno | G06K 7/0008 |
| | | | | 340/10.2 |
| 7,187,288 | B2 * | 3/2007 | Mendolia | G06K 7/10336 |
| | | | | 340/572.1 |
| 8,020,774 | B2 * | 9/2011 | Ohashi | G06K 7/10336 |
| | | | | 340/572.1 |
| 9,665,848 | B1 * | 5/2017 | Johnson | G08B 13/2417 |
| 9,959,439 | B1 * | 5/2018 | Lui | G06Q 10/0833 |
| 10,482,292 | B2 * | 11/2019 | Clouser | G06K 7/10009 |
| 10,727,578 | B2 | 7/2020 | Anderson et al. | |
| 11,132,876 | B1 * | 9/2021 | Steiner | G07G 1/0045 |
| 11,222,186 | B2 * | 1/2022 | Mullen | G06K 7/10376 |
| 11,275,982 | B1 * | 3/2022 | Landry | G06K 7/10356 |
| 11,449,692 | B2 * | 9/2022 | Suzuki | G07G 3/00 |
| 11,466,505 | B1 * | 10/2022 | Schwartz | A61B 46/20 |
| 11,495,097 | B2 * | 11/2022 | Steiner | G07G 1/009 |
| 2006/0208072 | A1 * | 9/2006 | Ku | G07G 1/009 |
| | | | | 235/383 |
| 2008/0014978 | A1 | 1/2008 | Kaneko et al. | |

(Continued)

*Primary Examiner* — Daniel I Walsh
(74) *Attorney, Agent, or Firm* — Patterson + Sheridan, LLP

(57) ABSTRACT

The present disclosure describes a directional radio frequency identification (RFID) system, which provides directional RFID tag scanning using RFID enclosures and moveable radio signal blocking components. The RFID systems herein also prevent unwanted RFID tag activation and focuses RFID readers on specific scan areas. The directional RFID systems may be implemented in any type of system that utilizes RFID tag reading, such as a point of sale systems and other related systems, which utilize RFID scanning.

17 Claims, 8 Drawing Sheets

(56) References Cited

U.S. PATENT DOCUMENTS

| | | | |
|---|---|---|---|
| 2008/0267666 A1* | 10/2008 | Shirokoshi | G03G 21/1647 399/222 |
| 2009/0273449 A1* | 11/2009 | Tuttle | H04Q 9/00 340/10.6 |
| 2012/0212327 A1* | 8/2012 | Torabi | G06K 7/10099 340/10.1 |
| 2018/0121780 A1* | 5/2018 | Rosenholtz | G06K 19/07722 |
| 2019/0042810 A1* | 2/2019 | Tsuchida | G06K 7/10297 |
| 2019/0244069 A1* | 8/2019 | Oishi | G06Q 20/3278 |
| 2019/0287354 A1* | 9/2019 | Yahata | G06K 7/10 |
| 2020/0125809 A1* | 4/2020 | Tsuchida | G06K 19/0723 |
| 2021/0073487 A1* | 3/2021 | Saegusa | G06K 7/10425 |
| 2022/0012440 A1* | 1/2022 | Saegusa | H01Q 1/2216 |
| 2022/0108146 A1* | 4/2022 | Bixon | G06K 7/10386 |
| 2023/0011537 A1* | 1/2023 | Peng | H01J 37/32642 |
| 2023/0306409 A1* | 9/2023 | Johnson | G06Q 20/208 |
| 2023/0358094 A1* | 11/2023 | Brush | E06B 7/32 |

* cited by examiner

DIRECTIONAL RADIO FREQUENCY IDENTIFICATION SYSTEM

BACKGROUND

The present disclosure relates to utilizing radio frequency identification (RFID) tags to detect and identify items marked with the RFID tags. Retail, warehouse, and other environments increasingly utilize RFID tags to track items through the various environments. For example, retail environments and warehouses both use RFID tags to track and update inventory levels. Additionally, RFID tags are becoming a more important part of the consumer experience where the RFID tags are used in consumer checkout processes. While using RFID readers and RFID tags provides useful advantages in tracking items, RFID readers often lack an ability to only activate and read RFID tags of interest, such as items in shopping cart, without activating and reading other incidental tags nearby.

DETAILED DESCRIPTION

RFID readers operate by transmitting signals (i.e., interrogating) to RFID tags. Some RFID tags are passive transponders which only activate and transmit a response signal when the transmitted signal is received at the RFID tag. Since no power is required for passive RFID tags, tags with identification and other information stored on the tag are applied to physical items for use in a variety of real world applications. The increasing number of RFID tags present in various environment also increases the probability that a single scan from a RFID reader will activate many nearby tags. In many cases, such as in shopping environments, multiple RFID tags may respond to a RFID reader, including RFID tags that are irrelevant to a given task. For example, a RFID tag for an item that a consumer wants to purchase responds to a RFID reader during a checkout process, but other RFID tags for other items may also respond. This can cause confusion to the user and errors in transactions.

Additionally, since RFID tags are used for a variety of functions, individual RFID readers may also serve several functions in one deployment. For example, a point of sale (POS) system may use an associated RFID reader to perform inventory tracking, complete transaction audits, and for checkout processes. In an example where the RFID reader is stationary or an integrated part of the larger POS system, the orientation and location of a single RFID reader is often not optimized for each of the various functions of the overall system. This non-optimized location in a POS system may result in unintended RFID tag responses and necessitate additional RFID readers at varying locations to provide appropriate coverage and direction for each of the functions of the POS system.

The systems and methods described herein utilize a directional RFID system, which provides for directional RFID tag scanning using RFID enclosures and moveable radio signal blocking components. The RFID systems herein prevent unwanted RFID tag activation and focuses RFID readers on specific scan areas. The directional RFID systems may be implemented in any type of system that utilizes RFID tag reading, such as a POS system described in relation to FIG. 1.

Advantages of the RFID System

The RFID system improves on accuracy for reading and identifying RFID tags in variety of use cases, including the reading of RFID tags in an item audit or checkout process in POS systems. Specifically, the POS system and RFID system utilizes an RFID enclosure with openings to block RFID signals and provide directional RFID signals to areas of interest. The directional RFID signals reduce errors in reading RFID signals and speed up processes, which utilize information extracted from RFID tag information.

Figure 1:
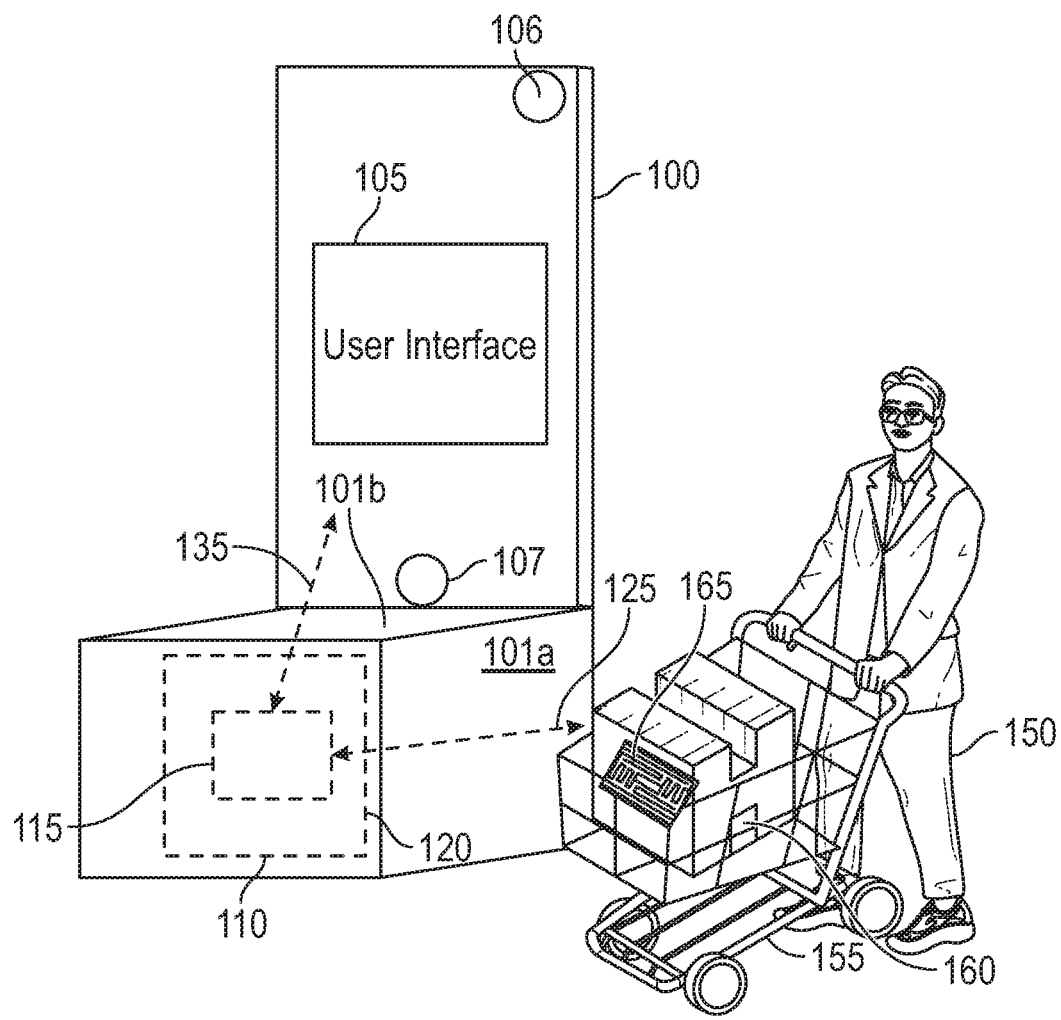
FIG. 1 illustrates an exemplary point of sale (POS) system with an RFID system, according to one embodiment.

FIG. 1 illustrates POS system 100 with an RFID system 110, according to one embodiment. The POS system 100 includes various input and output devices for facilitating use of the POS system. For example, a user 150 interacts with a user interface 105 of the POS system 100. The user interface 105 may include a display for providing visual information to the user 150, microphones, speakers, physical inputs and/or touch screen display inputs (e.g., buttons, keyboard, etc.), and other interactive components.

In some examples, the POS system 100 facilitates transactions or checkout processes in a retail environment, where the POS system 100 aids the user 150 in completing a retail checkout process for items selected for purchase. For example, the user approaches the POS system 100 with a cart 155, which contains items 160 that the user selected from the retail environment to purchase. The POS system 100 provides varying levels of automation for the checkout. For example, the POS system 100, using various sensors such as a camera or sensor 106, may identify the items 160 as the user approaches the POS system 100. In some examples, the POS system 100 may also require the user to scan some or all of the items 160 via the scanner 107 or other input methods.

For example, the user 150 may move the items 160 over a surface of the POS system, such as the surface 101b, where the scanner 107, such as a barcode reader, visual sensor, etc., detects and scans information from the item (e.g., a barcode) and the POS system uses the information from the scanner 107 to identify and add the items 160 to a transaction invoice.

In some examples, the POS system includes an RFID system 110, which includes an RFID reader 115, which scans an RFID tag 165 associated with the items 160. As described herein, the RFID system 110 also includes an RFID enclosure, such as the enclosure 120, where the RFID reader 115 is located within the enclosure 120. In some examples, the RFID system 110 is integrated within the POS system 100 such that it is not visible to the user 150. In these examples, any barrier or cover of the over POS system structure does not impede any radio signals or communication from the RFID system.

As discussed above, previous RFID systems lacked an ability to limit the spread of radio signals to various areas around the RFID system, which could cause unwanted RFID tag activation. In contrast, the RFID system 110 provides directional RFID signals 125 and 135. For example, at a first time when a user approaches the POS system 100, the RFID system activates the directional RFID signal 125 to focus on the cart 155, where the directional RFID signal 135 is not emitting from the RFID system 110. At a second time, when the user is scanning or moving items over the surface 101b, the RFID system activates the directional RFID signal 135 to focus on the area above the surface 101b, where the directional RFID signal 125 is not emitting from the RFID system 110. The use of directional signals reduces potential errors introduced by a wider signal transmission from the RFID reader 115. The directional signals also provide more focused coverage for the tasks associated with each signal. The RFID system 110 provides the directional signals using moveable radio signal blocking components described in more detail in relation to FIGS. 2A-2B and 3A-3B.

Figure 2A:
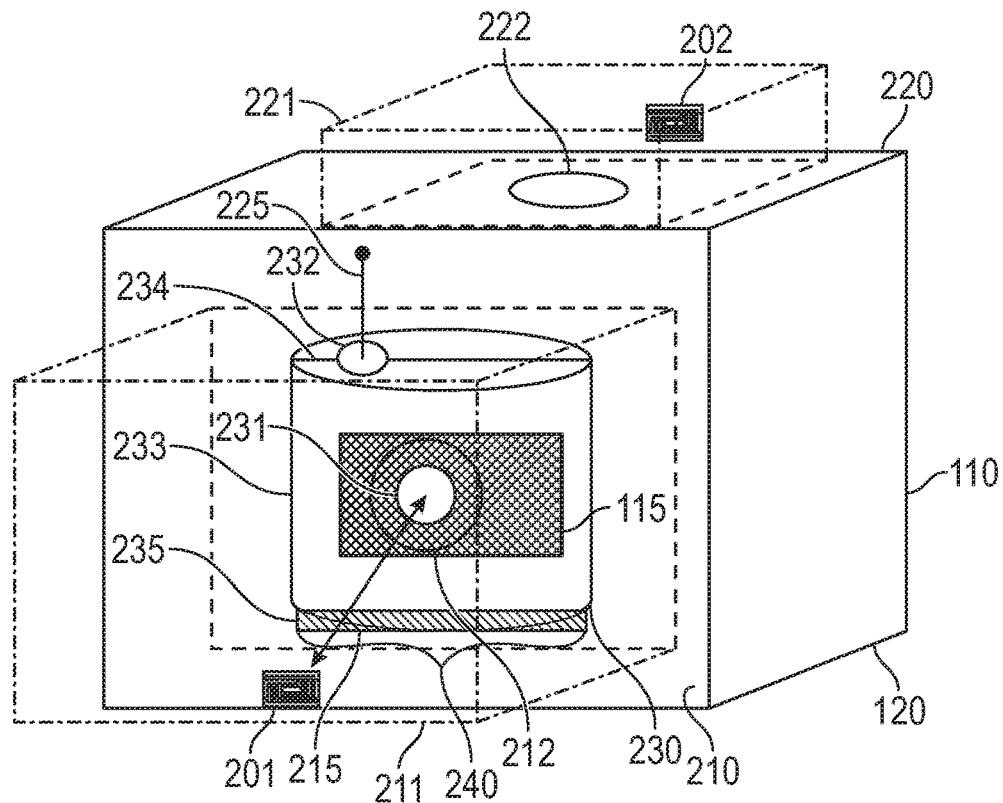
FIGS. 2A and 2B illustrate an RFID system, according to various embodiments.
Figure 2B:
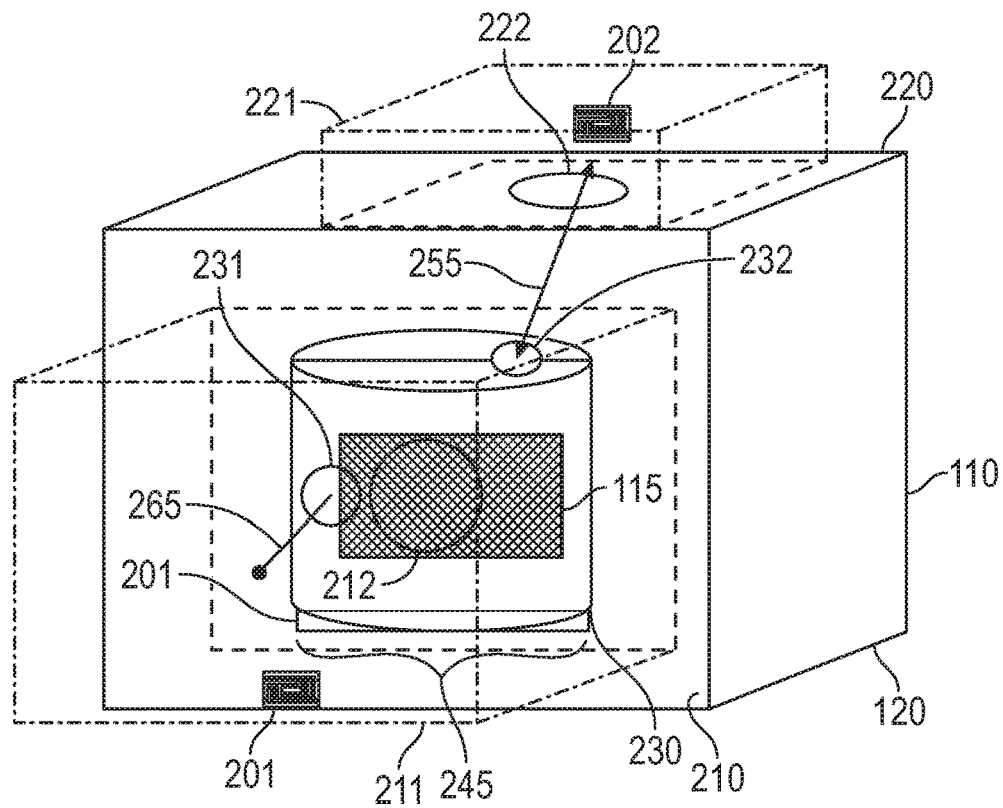

FIGS. 2A and 2B illustrate an RFID system, according to various embodiments. For example, the RFID system 110 includes the enclosure 120 and the RFID reader 115 within the enclosure 120. In some examples, the enclosure 120 is positioned within the POS system 100 as shown in FIG. 1. The enclosure 120 includes a first face 210 and a second face 220. The first face 210 includes a first opening 212 formed on the first face 210, and the second face 220 includes a second opening 222 formed on the second face.

In some examples, the first opening 212 and the second opening 222 are holes/voids formed in the respective face of the enclosure 120. In another example, the first opening 212 and the second opening 222 include a radio transmissive material formed within the opening, where the radio transmissive material is different from the material of the enclosure 120. For example, the enclosure 120 includes a radio signal blocking material, and the radio transmissive material formed within or over the respective openings allows for radio signals to propagate through the radio transmissive material and thus through the first opening 212 and second opening 222.

The first face 210 and the second face 220 also include associated scan areas outside of the enclosure 120. For example, a first scan area 211 is located adjacent to the first face 210 and the first opening 212. Additionally, a second scan area 221 is located adjacent to the second face 220 and the second opening 222. In some examples, the first scan areas 211 and the second scan area 221 are the areas near the RFID system 110 where RFID tags are detectable by the RFID reader 115. For example, activation signals transmitted by the RFID reader 115 may reach RFID tag 201 in the first scan area 211 and RFID tag 202 in the second scan area 221. As discussed above, in order to prevent erroneous or duplicate readings and to provide delineation between readings when items are in the first scan area 211 and the second scan area 221, the RFID system 110 includes a moveable radio signal blocking component such as component 230.

In some examples, the component 230 is a cylinder, or other suitable container, positioned as an inner structure within an outer structure, where the outer structure is the enclosure 120. In order to provide directional RFID signals, the RFID reader 115 is positioned within the component 230 (e.g., within the cylinder of the component 230). The sides or sidewalls of the component 230 may include radio signal blocking material which prevents radio signals from propagating through the sides of the component 230 (except for specific holes discussed herein). In some examples, the component 230 is a Faraday cage or other suitable enclosure, which blocks radio signals from propagating through the sidewalls of the component.

In some examples, the component 230 also includes at least two holes formed in sidewalls or sides of the component. For example, a first hole 231 is formed in a first side, such as sidewall 233 of the component 230. A second hole 232 is formed in a second side, such as top side 234 of the component 230. The first hole 231 and second hole 232 may include holes/voids formed in or through the respective sides of the component 230. In some examples, the first hole 231 and second hole 232 includes a transmissive material, which allows for radio signals to propagate through the transmissive material.

The RFID system 110 also includes an actuator 235 positioned to move, turn, or otherwise alter the position of the component 230 within the enclosure 120. For example, in a first configuration, shown in FIG. 2A, the actuator 235 turns or positions the component 230 to a first position 240. In the first position 240, the first hole 231, in the component 230, aligns with the first opening 212, in the first face 210 (e.g., the first hole 231 and the first opening 212 are concentric).

In the first configuration, the RFID reader 115 has a clear radio transmission path to the first scan area 211 through the component 230, via the first hole 231, and through the enclosure 120, via the first opening 212 in first face 210. For example, radio signals 215 travel from the RFID reader 115 to the RFID tag 201 and back from the RFID tag 201 to the RFID reader 115. In some examples, the radio signals 215 include the interrogatory signals transmitted from the RFID reader 115 and the response signals from the activated RFID tag 201.

In some examples, additional radio signals may emit out of the component 230. For example, radio signals 225 transmit from the RFID reader 115 and emit through the second hole 232, but terminate before activating RFID tags (i.e., the radio signals 225 do not exit the enclosure 120). For example, the second hole 232, in the component 230, is not aligned with the second opening 222 such that the radio signals 225 cannot transmit through the second face 220 or the second opening 222. The first configuration allows for the RFID system 110 to directionally activate and record any RFID tags within the first scan area 211 without incidentally activating and detecting RFID tags outside of the first scan areas 211 (e.g., in the second scan area 221).

Once the RFID system has completed scans to identify the RFID tags in the first scan area, the actuator 235 turns, repositions, or otherwise moves the component 230 to a second position such that the RFID system 110 is in a second configuration as shown in FIG. 28. In the second configuration, the component 230 is in second position 245. In the second position 245, the second hole 232, in the component 230, aligns with the second opening 222 (e.g., the second hole 232 and the second opening 222 are concentric).

In the second configuration, the RFID reader 115 has a clear radio transmission path to the second scan area 221 through the component 230, via the second hole 232, and through the enclosure 120, via the second opening 222 in second face 220. For example, radio signals 255 travel from the RFID reader 115 to the RFID tag 202 and back from the RFID tag 202 to the RFID reader 115. In some examples, the radio signals 255 include the interrogatory signals transmitted from the RFID reader 115 and the response signals from the activated RFID tag 202.

In some examples, additional radio signals may emit out of the component 230. For example, radio signals 265 transmit from the RFID reader 115 and through the first hole 231, but terminate before activating RFID tags. For example, the first hole 231, in the component 230, is not aligned with the first opening 212, in the first face 210 such that the radio signals 265 cannot transmit through the first face 210 and the first opening 212. The second configuration allows for the RFID system 110 to directionally activate and record any RFID tags within the second scan area 221 without incidentally activating and detecting RFID tags outside of the second scan area 221 (e.g., in the first scan area 211).

Figure 5:
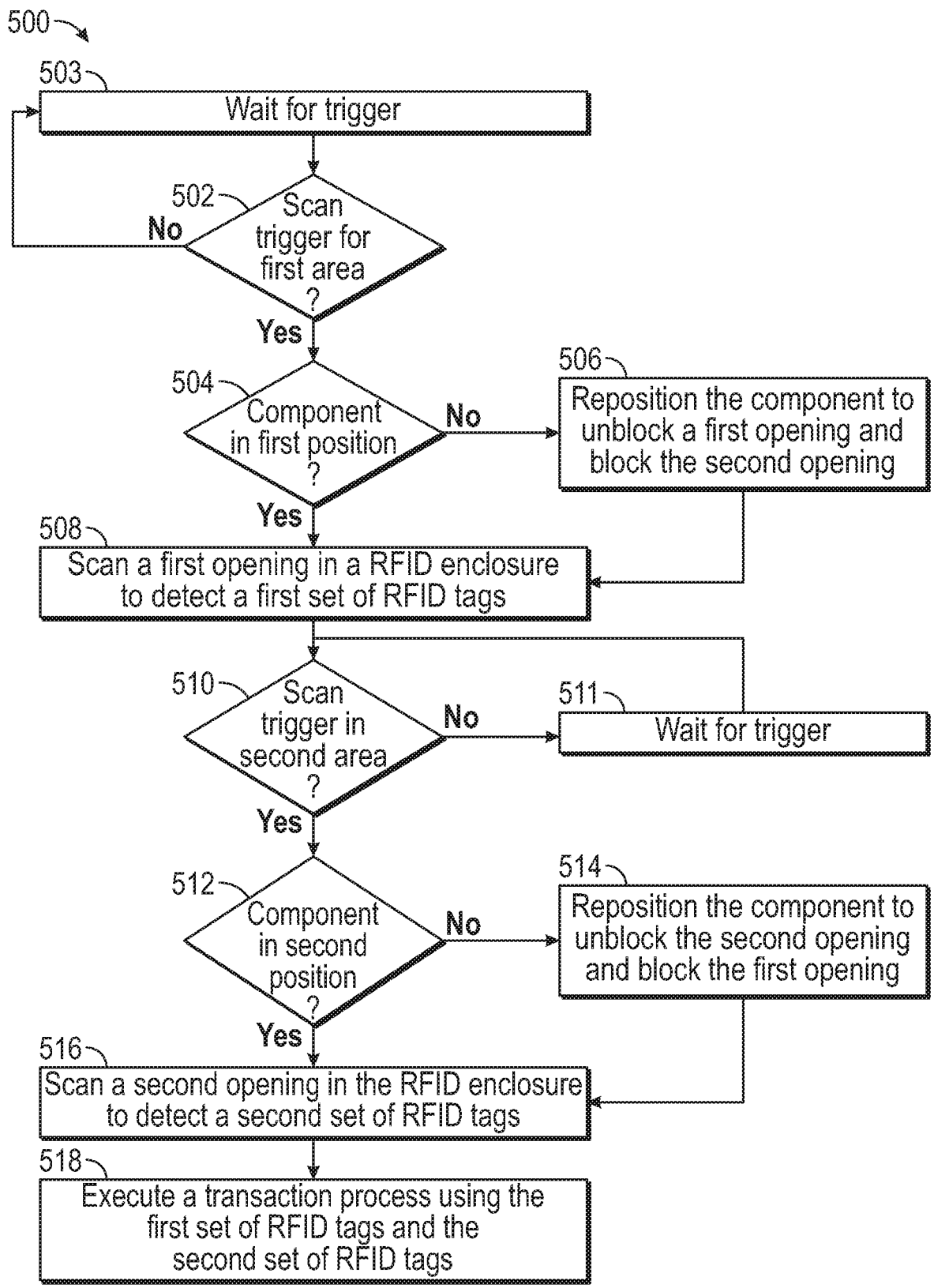
FIG. 5 is block flow diagram of a method for operating an RFID system, according to one embodiment.

In some examples, the RFID system 110 and the POS system 100 may alternate between the first configuration and the second configuration based on various needs of the POS system 100, inputs from the user 150, and triggers events for moving between the various configurations as discussed in relation to FIG. 5. The RFID system 110 may activate the actuator to position the component 230 between the first configuration and the second configuration as needed. In another example, the RFID system 110 may utilize different radio signal blocking components to alternate between first and second configurations as discussed in relation to FIGS. 3A and 3B.

Figure 3A:
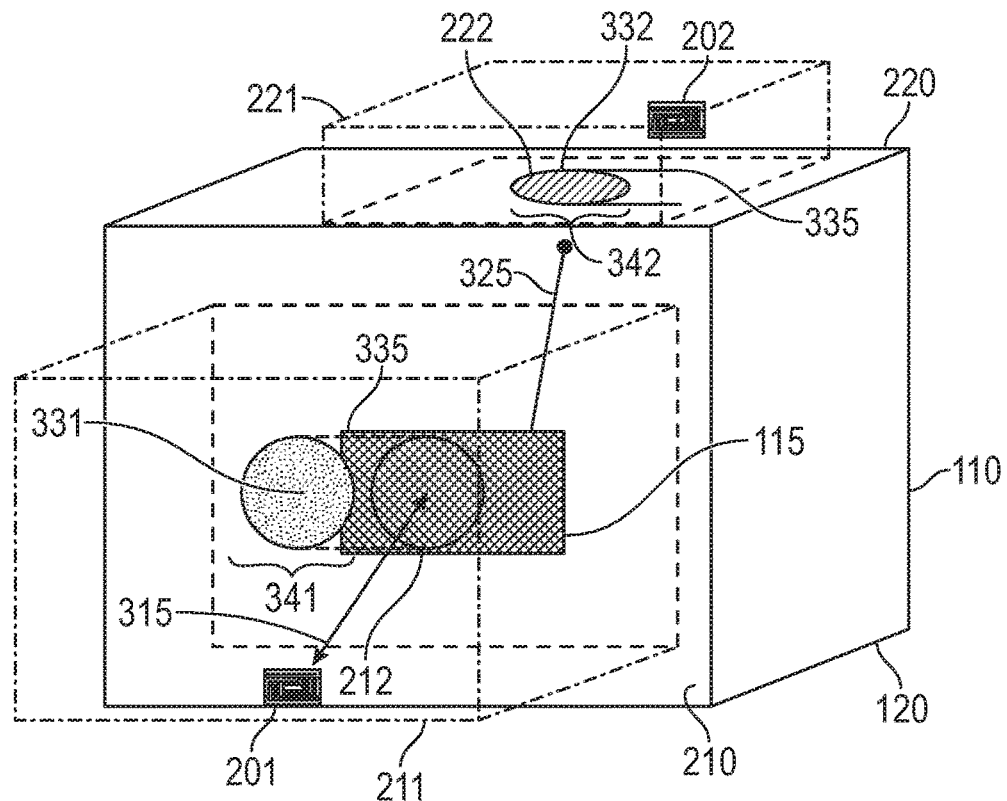
FIGS. 3A and 3B illustrate an RFID system, according to various embodiments.
Figure 3B:
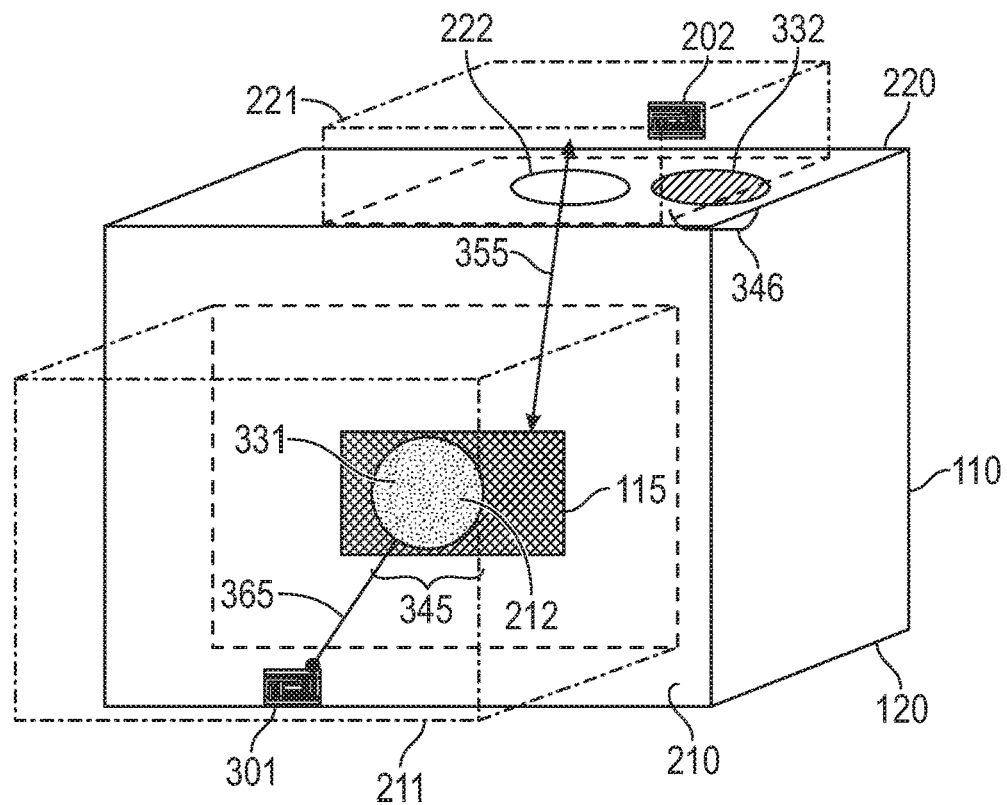

FIGS. 3A and 3B illustrate an RFID system with shutter components, according to various embodiments. In some examples, the RFID system 110 depicted in FIGS. 3A and 3B includes enclosure 120 in a similar manner to the enclosure 120 described in relation to in FIGS. 2A and 2B. For example, the enclosure 120 includes the first face 210, the second face 220, the first opening 212, and the second opening 222. The RFID system 110 also includes the first scan area 211 and the second scan area 221.

In order to prevent erroneous or duplicate readings and to provide delineation between readings when items are in the first scan area 211 and the second scan area 221, the RFID system 110 includes moveable radio signal blocking components such as shutter components including a first shutter 331 and a second shutter 332. In some examples, the first shutter 331 and second shutter 332 are disks, or other suitable components positioned within the enclosure 120. The first shutter 331 and second shutter 332 may include radio signal blocking material, which prevents radio signals from propagating through the respective shutters.

The RFID system 110, shown in FIGS. 3A and 3B, also include actuators 335 (depicted as rail actuators in FIG. 3A) associated with the respective shutters, where the actuators 335 move, turn, or otherwise alter the position of the first shutter 331 and second shutter 332 within the enclosure 120. For example, in a first configuration, shown in FIG. 3A, the actuators 335 turns or positions the first shutter 331 to a first position 341. In the first configuration, the RFID reader 115 has a clear radio transmission path to the first scan area 211 through the enclosure 120, via the first opening 212 in first face 210. For example, radio signals 315 travel from the RFID reader 115 to the RFID tag 201 and back from the RFID tag 201 to the RFID reader 115. In some examples, the radio signals 315 include the interrogatory signals transmitted from the RFID reader 115 and the response signals from the activated RFID tag 201.

In some examples, radio signals 325 transmit from the RFID reader 115, but terminate before activating RFID tags. For example, the second shutter in the first position 342 blocks the second opening 222, such that the radio signals 325 cannot transmit through the second face 220 and the second opening 222. The first configuration shown in FIG. 3A allows for the RFID system 110 to directionally activate and record any RFID tags within the first scan area 211 without incidentally activating and detecting RFID tags outside of the first scan areas 211 (e.g., in the second scan area 221).

Once the RFID system has completed scans to identify the RFID tags in the first scan area, the actuators 335 turns, repositions, or otherwise moves the first shutter 331 and the second shutter 332 to respective second positions such that the RFID system 110 is in a second configuration as shown in FIG. 3B. In this example, the first shutter 331 is in second position 345 and the second shutter 332 is in a second position 346.

In the second configuration, the RFID reader 115 has a clear radio transmission path to the second scan area 221 through the enclosure 120, via the second opening 222 in second face 220. For example, radio signals 355 travel from the RFID reader 115 to the RFID tag 202 and back from the RFID tag 202 to the RFID reader 115. In some examples, the radio signals 255 include the interrogatory signals transmitted from the RFID reader 115 and the response signals from the activated RFID tag 202.

In some examples, radio signals 365 transmit from the RFID reader 115, but terminate before activating RFID tags. For example, the first shutter in the second position 345 blocks the first opening 212, such that the radio signals 265 cannot transmit through the first face 210 or the first opening 212. The second configuration allows for the RFID system 110 to directionally activate and record any RFID tags within the second scan area 221 without incidentally activating and detecting RFID tags outside of the second scan area 221 (e.g., in the first scan area 211).

In the examples, described in relation to FIGS. 2A-3B the RFID reader 115 of the RFID system 110 does not require alteration or changes from the first configuration to the second configuration in order to transmit and received RFID signals (i.e., the component 230 moves around the RFID reader 115 without moving the RFID reader). In some examples, the RFID reader 115 may include RFID antennas and receivers that may be moved or changed according to various configurations as described in relation to FIGS. 4A-C.

Figure 4A:
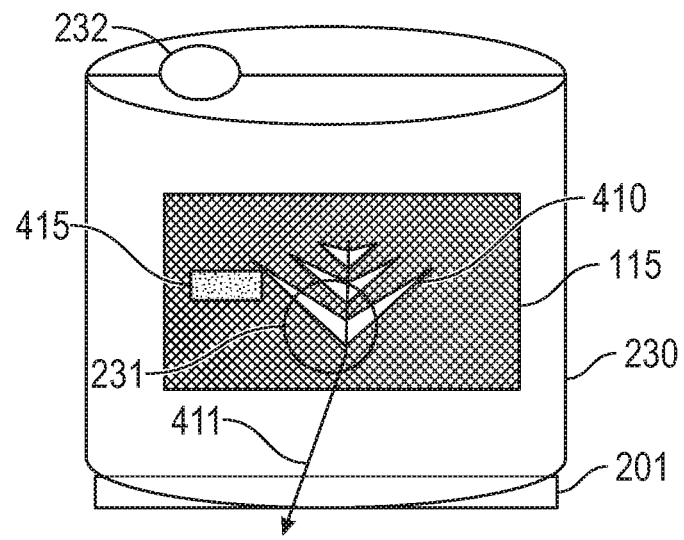
FIGS. 4A-4C illustrate RFID readers, according to various embodiments.
Figure 4B:
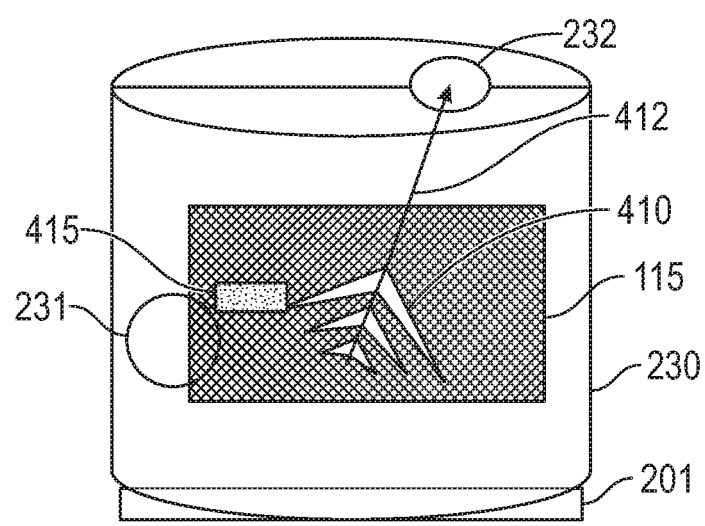
Figure 4C:
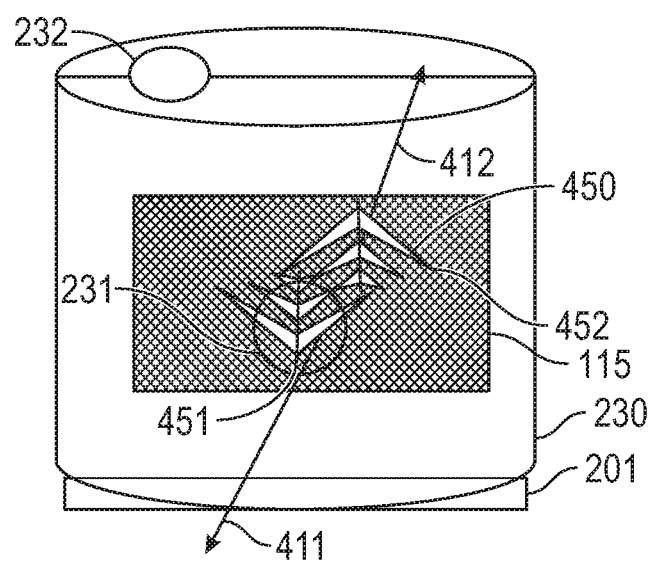

FIGS. 4A-4C illustrate an RFID reader, according to various embodiments. For examples, FIGS. 4A and 4B depict the RFID reader 115 with an antenna array 410 and antenna actuator 415. In FIG. 4A, the antenna array 410 is a movable RFID antenna in a first position, where the antenna array 410 is positioned to direct signal power from the antenna array towards first hole 231 and the first opening 212 (shown in FIGS. 2A-3B). For example, the antenna array 410 is directed towards the first opening 212 along direction 411 when the RFID system is in the first configuration (e.g., the first configuration of the RFID system described in relation to FIGS. 2A and 3A).

When the RFID system transitions from the first configuration to the second configuration (described in relation to FIGS. 2B and 3B), the antenna actuator 415 rotates or moves the antenna array 410 towards the second opening 222 (shown in shown in FIGS. 2A-3B). For example, in FIG. 4B the antenna array 410, in a second position, is facing direction 412, which directs signal power from the RFID reader 115 towards the second hole 232 and second opening 222. In the example shown in FIGS. 4A and 4B, the antenna array 410 is positioned within the component 230. In another example, the antenna array 410 may be positioned in the enclosure 120 without the component 230, such as described in relation to FIGS. 3A-B.

For example, the RFID reader 115 may include a stationary antenna such as antenna array 450 in FIG. 4C. The antenna array 450 is a stationary array of antennas with subsets of antennas located within the array. For example, second subset 452 includes antennas directed towards or along the direction 412 and first subset 451 includes antennas directed towards or along the direction 411. In some examples, the first subset 451 and the second subset 452 are collocated within the RFID reader 115 (i.e., form one set of antennas). In another example, the first subset 451 and the second subset 452 may be separate arrays located at different locations in the RFID reader 115 to maximize the directional signal along either the direction 411 or 412.

In some examples, the RFID reader 115 may activate/deactivate the subsets according to a current configuration of the RFID system 110. For example, the first subset 451 may be activated when the RFID system 110 is in the first configuration (described in relation to FIGS. 2A and 3A) and the second subset 452 may be activated when the RFID system is in the second configuration (described in relation to FIGS. 2B and 3B). The POS system 100 and the RFID system 110 may utilize various inputs received via the POS system 100 and the RFID system 110 to determine which a configuration for the RFID system at a given time and to perform transaction processes as described in relation to the methods of FIGS. 5 and 6.

FIG. 5 is block flow diagram of a method for operating an RFID system, according to one embodiment. In some examples, the POS system 100 executes the method 500 in conjunction with subsystems such as the RFID system 110. For ease of discussion of method 500 (and method 600 of FIG. 6), reference is made to components of the POS system 100, which are described in more detail above in relation to FIG. 1 and herein in relation to FIG. 7.

Method 500 begins at block 502 where the POS system 100 determines when a scanning trigger occurs for a first scanning area. For example, the POS system 100 detects, at a first time, a scanning trigger for the first scan area. In some examples, a scanning trigger for the first scan area includes a manual input and or scheduled trigger. For example, the POS system 100 may periodically scan the first area for RFID tags. This may include at the beginning of a transaction with a user, such as the user 150 in FIG. 1, during an ongoing transaction with a user, and at the end of a transaction. For example, the user 150 physically interacting with the POS system 100 to begin a transaction (e.g., a checkout process) triggers the POS system 100 to do a preliminary scan of the first scan area associated with the cart 155, where the first scan area is associated with the side 101a of the POS system 100. The POS system 100 may also include triggers to scan the first scan area during the ongoing transaction and at the end of the transaction to verify all items have been accounted for (e.g. an audit) or to add large items from the cart 155 to a transaction invoice for the user 150 without having to remove the items from the cart.

In another example, the POS system 100 detects a scanning trigger using the sensor 106 to detect that the user 150 is approaching the POS system 100. This allows the POS system 100 and RFID system 110 to prepare for and scan a first scan area as soon as the user is within the first scan area. When the POS system 100 does not detect or overrides a detected scanning trigger for the first scan area, method 500 proceeds to block 503.

At block 503, the POS system 100 enters an idle state for the RFID system 110. In some examples, the POS system 100 may leave the idle state at the block 503 via a detected trigger described in block 502 or a detected trigger described in relation to block 510 herein.

At block 504, the POS system 100 determines a position of at least one moveable radio signal blocking component of the RFID system 110. For example, the POS system 100 determines whether the RFID system is in the first configuration described in FIGS. 2A and 3A or the second configuration described in FIGS. 2B and 3B.

In an example where a first opening of an RFID enclosure of the RFID system 110 is blocked (e.g., the RFID system is in the second configuration), the POS system 100 repositions the at least one moveable radio signal blocking component to unblock the first opening and block a second opening of the RFID enclosure prior to scanning the first scan area at block 506. For example, the POS system 100 causes the actuators 235 or 335 to move the respective RFID systems from a second configuration to a first configuration. Additionally, when the RFID reader includes a moveable RFID antenna (as described in relation to FIGS. 4A-B), the POS system 100 also moves the moveable RFID antenna such that the first opening is unblocked as shown in FIG. 4A.

At block 508, the POS system 100 scans, using the RFID reader 115, the first scan area via the first opening to detect a first set of RFID tags located in a first scan area associated. For example, the POS system 100 scans the first scan area associated with the side 101a to detect a first set of RFID tags located in the cart 155. In some examples, the POS system 100 store the first set of RFID tags as an item tag inventory database 721, described in FIG. 7, for further use by the POS system 100. As the scan of the first scan area is completed, the POS system 100 may return to an idle state for the RFID system 110 or may reconfigure the RFID system 110 to detect RFID tags in a second scan area.

In blocks 510 and 512 through 516, the POS system repositions at least one moveable radio signal blocking component of the RFID enclosure to block the first opening and unblock a second opening in the RFID enclosure.

For example, at block 510 the POS system 100 detects a scanning trigger for the second scan area. For example, the POS system 100 detects a scanning trigger for the second scan area. In some examples, a scanning trigger for the second scan area includes a manual input and or scheduled trigger. For example, the POS system 100 may periodically scan the second area for RFID tags. This may include during an ongoing transaction with the user 150. For example, the user 150 physically interacting with the POS system 100 to begin a scanning items (e.g., a checkout process) triggers the POS system 100 to do perform ongoing scans of the second scan area associated with the scan area above the surface 101b.

In another example, the POS system 100 detects a scanning trigger using the sensor 106 and/or the scanner 107 to detect that the user 150 is moving items through a checkout area of the POS system 100. When the POS system 100 does not detect or overrides a detected scanning trigger for the second scan area, method 500 proceeds to block 511. At block 511, the POS system 100 enters an idle state for the RFID system 110. In some examples, the POS system 100 may leave the idle state at the block 503 via a trigger described in block 502 or a trigger described in relation to block 510.

At block 512, the POS system 100 determines a position of the at least one moveable radio signal blocking component. For example, the POS system 100 determines whether the RFID system is in the first configuration described in FIGS. 2A and 3A or the second configuration described in FIGS. 2B and 3B.

When the second opening is blocked, the POS system repositions the at least one moveable radio signal blocking component to unblock the second opening and block the first opening prior to scanning the second opening at block 514. In an example where a second opening of an RFID enclosure of the RFID system 110 is blocked (e.g., the RFID system is in the first configuration), the POS system 100 repositions the at least one moveable radio signal blocking component to unblock the second opening and block the first opening of the RFID enclosure prior to scanning the second scan area at block 516. For example, the POS system 100 causes the actuators 235 or 335 to move the respective RFID systems from a first configuration to a second configuration. Additionally, when the RFID reader includes a moveable RFID antenna (as described in relation to FIGS. 4A-B), the POS system 100 also moves the moveable RFID antenna such that the second opening is unblocked as shown in FIG. 4B.

At block 516, the POS system 100 scans, using the RFID reader, the second scan area via the second opening in the RFID enclosure to detect a second set of RFID tags located in a second scan area. For example, the POS system 100 scans the second scan area associated with the surface 101b to detect a second set of RFID tags located in a checkout zone of the POS system 100. In some examples, the POS system 100 also stores the first set of RFID tags in the item tag inventory database 721, for further use by the POS system 100. As the scan of the first scan area is completed, the POS system 100 may return to an idle state for the RFID system 110 or may reconfigure the RFID system 110 to detect RFID tags in a first scan area during an ongoing transaction.

At block 518, the POS system 100 executes a transaction process using the first set of RFID tags and the second set of RFID tags. In some examples, the transaction process may include transaction processes during an ongoing transaction with the user 150 and include any process that may be performed by the POS system 100 using the information received via the RFID system 110. For example, an audit process, an item identification process, or a checkout process may all be initiated during an ongoing transaction. Additionally, the POS system 100 and the RFID system 110 may continue performing the processes described in relation to blocks 502-516 while a transaction process is also being completed.

In some examples, the POS system 100 may also receive sensor data from at least one external sensor such as the sensors 106 and 107 and determine an identification of at least one item using the sensor data. In some examples, the POS system 100 augments the transaction process using the identification of the at least one item. For example, the POS system 100 may augment item identification steps in an audit or checkout process using the information received via the sensors 106 and 107. Additional transaction processes are described in relation to FIG. 6.

Figure 6:
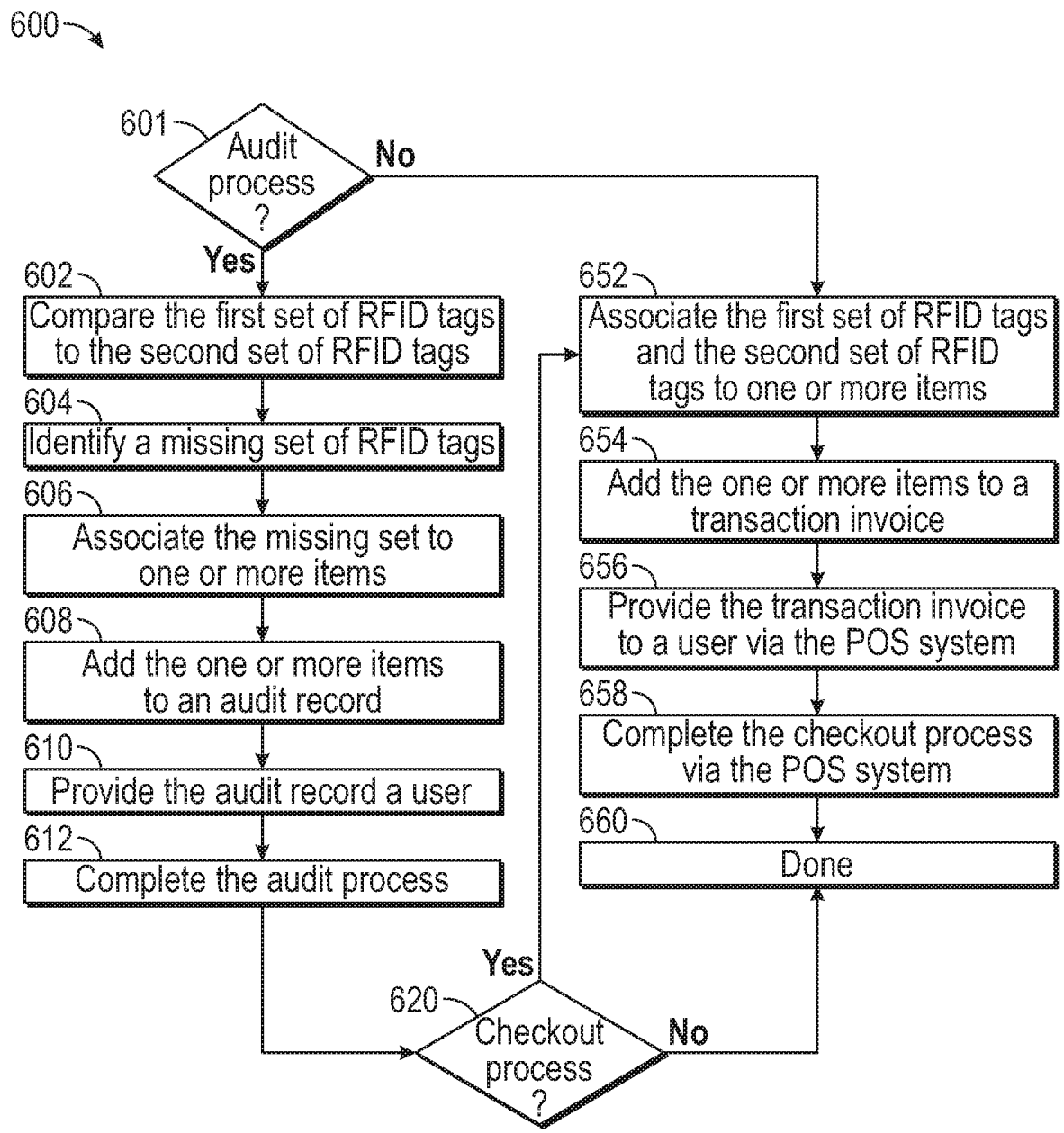
FIG. 6 is block flow diagram of method for transaction processes, according to one embodiment.

FIG. 6 is block flow diagram for transaction processes, according to one embodiment. In some examples, blocks 602-612 represent a method for an audit process and blocks 652-658 represent a method of a checkout process. The audit process and checkout process may also be performed independently from each other. Method 600 begins at block 601 where the POS system 100 determines if an audit process is needed for the POS system 100. For example, the POS system 100 determines, based on the user 150, items 160, any transaction exceptions or errors, and other factors, whether to conduct an audit of items. When an audit is not required method 600 proceeds to block 652.

At block 602, the POS system 100 compares the first set of RFID tags to the second set of RFID tags. For example, the POS system compares tags stored in the item tag inventory database 721 for any discrepancies between the first set and the second set. At block 604, the POS system 100 identifies a missing set of RFID tags. For example, the user 150 may have forgotten to scan an item in the bottom of cart 155. In this example, the first set of RFID tags (i.e., the scan of the first scan area) includes RFID tag(s) for the forgotten item and the second set of RFID tags does not include the RFID tag(s) for the forgotten item. The missing set may also include additional RFID tags for other discrepancies between the first set of RFID tags and the second set of RFID tags.

At block 606, the POS system 100 associates the missing set to one or more items. For example, the POS system 100 uses the RFID tags for the forgotten item in the missing set and an item index 722 to determine an identification for the forgotten item. For example, the forgotten item may include dog food that was left on the bottom of the cart 155.

At block 608, the POS system 100 adds the one or more items to an audit record and provides the audit record to a user via the POS system at block 610. In some examples, the audit record is a notification identifying the forgotten item. For example, the audit record includes a name of the forgotten item (dog food) and a picture of the item (e.g., a picture of bag of the dog food). The POS system 100 may provide the audit record to the user via the user interface 105 and other means to bring the attention of the user to the discrepancy.

At block 612, the POS system 100 completes the audit process via the POS system. In some examples, completing the audit process may include allowing the user to remedy the discrepancy, calling an attendant for the POS system, overriding the discrepancy, or other processes to accept or correct the discrepancy between the RFID tag sets. In some examples, the audit process may be done prior to a completion of a checkout process or may be a standalone process.

At block 620, the POS system 100 determines if an checkout process is needed for the POS system 100. For example, when the audit process is a standalone process, the method 600 proceeds to block 660. When the audit process is a part of or proceeds a checkout process, the method 600 proceeds to block 652.

At block 652, the POS system 100 associates the first set of RFID tags and the second set of RFID tags to one or more items. For example, the POS system uses the item tag inventory database 721 and the item index 722 to determine an identification of the items. In some examples, the POS system 100 uses just one of the first set and the second set of RFID tags to associate items. For example, when the second set includes only the items the user 150 desires to purchase, the second set is used to identify the items. In another example, both sets include different detected RFID tag identifications and are both used to associate/identify items from the item index 722.

At block 654, the POS system 100 adds the one or more items to a transaction invoice and at block 656, the POS system 100 provides the transaction invoice to a user via the POS system. For example, the POS system 100 provides a total number of items selected for purchase and outputs the total to the user 150 via the user interface 105. At block 658, the POS system 100 completes the checkout process via the POS system. In some examples, the user 150 provides inputs to alter or update the transaction record and provides a means of payment to resolve any outstanding charges to complete the checkout process. At block 660, the POS system completes the transaction processes and returns to an idle state such as at block 503 in FIG. 500.

Figure 7:
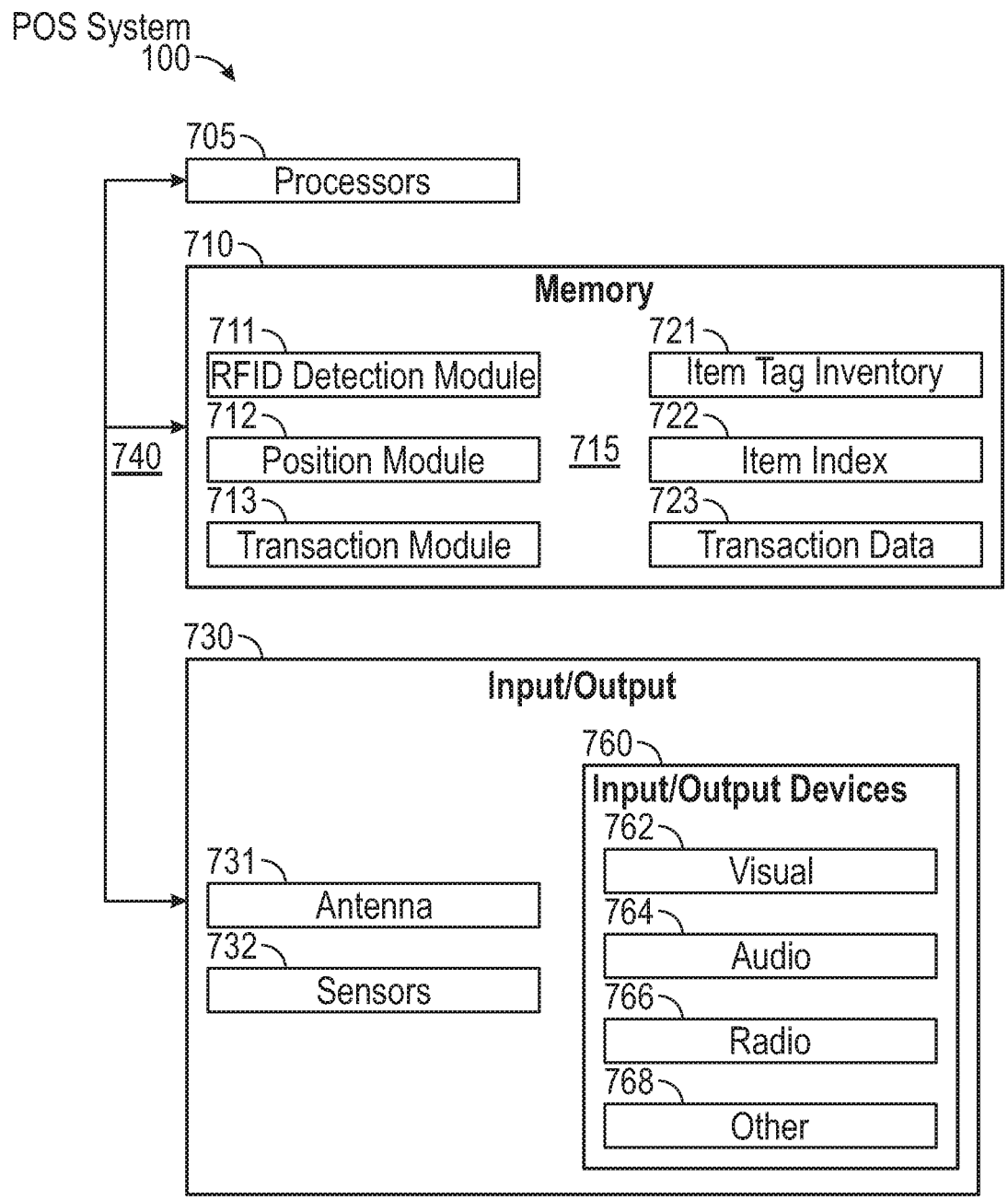
FIG. 7 illustrates a block diagram of an exemplary POS system with an RFID system, according to one embodiment.

FIG. 7 illustrates an exemplary POS system, according to one embodiment. Specifically, FIG. 7 illustrates the POS system 100, which includes a number of computer processors, such as processors 705, memory 710, and input/output 730, which are interconnected using one or more connections 740. In one embodiment, the POS system 100 may be implemented as a singular computing device and connection 740 may represent a common bus. In other embodiments, POS system 100 is distributed and includes a plurality of discrete computing devices that are connected through wired or wireless networking. The processors 705 may include any processing element suitable for performing functions described herein, and may include single or multiple core processors, as well as combinations thereof. Processors 705 may be included in a single computing device, or may represent an aggregation of processing elements included across a number of networked devices such as multiple POS systems 100, etc.

Memory 710 may include a variety of computer-readable media selected for their size, relative performance, or other capabilities: volatile and/or non-volatile media, removable and/or non-removable media, etc. Memory 710 may include cache, random access memory (RAM), storage, etc. Storage included as part of memory 710 may typically provide a non-volatile memory for the networked computing devices, and may include one or more different storage elements such as Flash memory, a hard disk drive, a solid state drive, an optical storage device, and/or a magnetic storage device. Memory 710 may be included in a single computing device or may represent an aggregation of memory included in networked devices. Memory 710 may include a plurality of modules 715 for performing various functions described herein. The modules 715 generally include program code that is executable by one or more of the processors 705.

As shown, modules 715 include RFID detection module 711, position module 712, and transaction module 713. The modules 715 may also interact to perform certain functions. For example, position module 712 during operation may make calls to the transaction module 713, and so forth. The person of ordinary skill will recognize that the modules provided here are merely non-exclusive examples; different functions and/or groupings of functions may be included as desired to suitably operate the environment. Memory 710 may also include item tag inventory database 721, item index 722, and a transaction database 723. In one embodiment, item tag inventory database 721, item index 722, and transaction database 723 are stored on the POS system 100 or on a separate database accessible to the POS system 100. In some examples, the item tag inventory database 721 includes the detected/read information from RFID tags at a time of item purchase and the item index 722 includes information that relates to the item including information such expected RFID tags, item price, item type, and other information. In some examples, the transaction database 723 include information related to specific items and the transaction records. In some examples, the transaction database 723 is used to track specific item using identification information and to correlate the specific item to an item tag inventory stored in the item tag inventory database 721.

Input/output (I/O) 730 includes the antenna 731, which may be embodied as the RFID reader 115, and sensors 732 (including sensors 106 and 107). I/O 730 may further include input/output devices (e.g. user interface) 105 that may be included to enhance the experience for persons interacting with the POS system 100. In some embodiments, the POS system 100 includes input/output devices 760, such as visual devices 762 (e.g., visual displays, indicators), audio devices 764 (e.g., speakers) and/or radio devices 766 for communicating with persons during their transactions. The input/output devices 760 may also include other devices 768 that provide information to people through tactile feedback (e.g., haptic devices) or using other sensory stimuli.

The input/output devices may also include suitable devices capable of receiving input from persons, such as cameras, keyboards or keypads, touchscreens, buttons, inertial sensors, etc. I/O 730 may further include wired or wireless connections to an external network using I/O adapter circuitry. As described above, the elements of the POS system 100 interact to perform the functions of the POS system 100 as described in greater detail in relation to FIGS. 5-6 herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., a POS system including the modules 715) or related data available in the cloud. For example, the modules 715 could execute on a computing system in the cloud and control the POS system 100 and RFID system 110 via a remote connection in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

The invention claimed is:

1. A method comprising:
    scanning, using a radio frequency identification (RFID) reader, a first scan area via a first opening in a RFID enclosure to detect a first set of RFID tags located in the first scan area, where the RFID enclosure blocks RFID signals except at the first opening and a second opening;
    repositioning at least one moveable radio signal blocking component of the RFID enclosure to block the first opening and unblock the second opening in the RFID enclosure;
    scanning, using the RFID reader, a second scan area via the second opening in the RFID enclosure to detect a second set of RFID tags located in the second scan area; and
    executing a transaction process using the first set of RFID tags and the second set of RFID tags, wherein the transaction process comprises a checkout process performed at a point of sale (POS) system, and wherein executing the transaction process comprises:
        associating the first set of RFID tags and the second set of RFID tags to one or more items selected for purchase;
        adding the one or more items to a transaction invoice for a user;
        providing the transaction invoice to the user via the POS system; and
        completing the checkout process via the POS system.

2. The method of claim 1, wherein the transaction process comprises an audit process performed at a point of sale (POS) system, and wherein executing the transaction process comprises:
    comparing the first set of RFID tags to the second set of RFID tags to identify a missing set comprising one or more RFID tags detected in the first set of RFID tags and not detected in the second set of RFID tags;
    associating the missing set to one or more items;
    adding the one or more items to an audit record;
    providing the audit record to a user via the POS system; and
    completing the audit process via the POS system.

3. The method of claim 1, wherein the RFID reader comprises a moveable RFID antenna, wherein the moveable RFID antenna is in a first position directed at the first opening when the first opening is unblocked, wherein the moveable RFID antenna is in a second position directed at the second opening when the second opening is unblocked, and wherein the method further comprises:
    moving the moveable RFID antenna from the first position to the second position when the second opening is unblocked; and
    moving the moveable RFID antenna from the second position to the first position when the first opening is unblocked.

4. The method of claim 1, wherein the RFID reader comprises a plurality of RFID antennas, wherein a first subset of the plurality of RFID antennas is positioned within the RFID enclosure to scan the first scan area, and wherein a second subset of the plurality of RFID antennas is positioned the RFID enclosure to scan the second scan area.

5. The method of claim 1, further comprising:
    receiving sensor data from at least one external sensor;
    determining an identification of at least one item using the sensor data; and
    augmenting the transaction process using the identification of the at least one item.

6. The method of claim 1, further comprising:
    detecting, at a first time, a scanning trigger in the first scan area;
    when the first opening is blocked at the first time, repositioning the at least one moveable radio signal blocking component to unblock the first opening and block the second opening prior to scanning the first opening;
    detecting, at a second time, a scanning trigger in the second scan area; and
    when the second opening is blocked at the second time, repositioning the at least one moveable radio signal blocking component to unblock the second opening and block the first opening prior to scanning the second opening.

7. A radio frequency identification (RFID) system comprising:
    an RFID enclosure, where the RFID enclosure blocks RFID signals except at a first opening and a second opening, wherein the RFID enclosure comprises:
        an outer structure comprising at least:
            the first opening formed on a first face of the RFID enclosure;
            the second opening formed on a second face of the RFID enclosure; and
        at least one moveable radio signal blocking component positioned to block the first opening in a first configuration and positioned to block the second opening in a second configuration, wherein the at least one moveable radio signal blocking component comprises an inner structure positioned within the outer structure, wherein the inner structure comprises:
            a first hole formed in a first side of the inner structure; and
            a second hole formed in a second side of the inner structure;
        wherein the inner structure is in a first position in the first configuration, wherein the first hole aligns to the first opening of the outer structure to allow radio signals to propagate through the first hole and the first opening;
        wherein the inner structure, in the first position, blocks the second opening to prevent radio signals from propagating through the second opening;
        wherein the inner structure is in a second position in the second configuration, wherein the second hole aligns to the second opening of the outer structure to allow radio signals to propagate through the second hole and the second opening; and
        wherein the inner structure, in the second position, blocks the first opening to prevent radio signals from propagating through the first opening; and
    an RFID reader positioned within the RFID enclosure.

8. The RFID system of claim 7,
    wherein at least two faces of the RFID enclosure comprises a radio signal blocking material,
    wherein the at least one moveable radio signal blocking component comprises a first shutter component and a second shutter component, wherein the second shutter component is positioned to block the second opening in the first configuration, and wherein the first shutter component is positioned to block the first opening in the second configuration.

9. The RFID system of claim 7, further comprising:
an actuator, wherein the actuator:
moves the at least one moveable radio signal blocking component from the second configuration and to the first configuration; and
moves the at least one moveable radio signal blocking component from the first configuration and to the second configuration.

10. The RFID system of claim 7, wherein the RFID reader comprises a moveable RFID antenna, wherein the moveable RFID antenna is in a first position directed at the first opening when the at least one moveable radio signal blocking component is in the first configuration, wherein the moveable RFID antenna is in a second position directed at the second opening when the moveable radio signal blocking component is in the second configuration.

11. The RFID system of claim 7, wherein the RFID reader comprises a plurality of RFID antennas, wherein a first subset of the plurality of RFID antennas is positioned to scan the first opening, and wherein a second subset of the plurality of RFID antennas is positioned to scan the second opening.

12. A point of sale (POS) system comprising:
a radio frequency identification (RFID) system comprising:
an actuator
an RFID enclosure comprising:
a first opening formed on a first face of the RFID enclosure;
a second opening formed on a second face of the RFID enclosure; and
at least one moveable radio signal blocking component positioned to block the first opening in a first configuration and positioned to block the second opening in a second configuration; and
an RFID reader positioned within the RFID enclosure;
one or more computer processors; and
a memory containing program code which, when executed by the one or more computer processors, performs an operation comprising:
scanning, using the RFID reader, a first scan area via the first opening to detect a first set of RFID tags located in the first scan area;
repositioning, using the actuator, the at least one moveable radio signal blocking component from the first configuration to the second configuration;
scanning, using the RFID reader, a second scan area via the second opening to detect a second set of RFID tags located in the second scan area; and
executing a transaction process using the first set of RFID tags and the second set of RFID tags, wherein the transaction process comprises a checkout process, and wherein executing the transaction process comprises:
associating the first set of RFID tags and the second set of RFID tags to one or more items;
adding the one or more items to a transaction invoice for a user;
providing the transaction invoice to the user via a user interface associated with the POS system; and
completing the checkout process using user inputs received via the user interface.

13. The POS system of claim 12, wherein the transaction process comprises an audit process, and wherein executing the transaction process comprises:
comparing the first set of RFID tags to the second set of RFID tags to identify a missing set comprising one or more RFID tags detected in the first set of RFID tags and not detected in the second set of RFID tags;
associating the missing set to one or more items;
adding the one or more items to an audit record;
providing the audit record to a user via a user interface associated with the POS system; and
completing the audit process using user inputs received via the user interface.

14. The POS system of claim 12, wherein the RFID reader comprises a moveable RFID antenna and an antenna actuator, wherein the moveable RFID antenna is in a first position when the first opening is unblocked, wherein the moveable RFID antenna is in a second position when the second opening is unblocked, and wherein the operation further comprises:
moving, using the antenna actuator, the moveable RFID antenna from the first position to the second position when the RFID enclosure is in the first configuration; and
moving the moveable RFID antenna from the second position to the first position when the RFID enclosure is in the second configuration.

15. The POS system of claim 12, wherein the RFID reader comprises a plurality of RFID antennas, wherein a first subset of the plurality of RFID antennas is positioned to scan the first scan area, and wherein a second subset of the plurality of RFID antennas is positioned to scan the second scan area.

16. The POS system of claim 12, wherein the system further comprises at least one external sensor, and wherein the operation further comprises:
receiving sensor data from the at least one external sensor;
determining an identification of at least one item using the sensor data; and
augmenting the transaction process using the identification of the at least one item.

17. The POS system of claim 12, wherein the system further comprises at least one external sensor, and wherein the operation further comprises:
detecting, at a first time and via the at least one external sensor, a scanning trigger in the first scan area;
when the first opening is blocked at the first time, repositioning the at least one moveable radio signal blocking component to unblock the first opening and block the second opening prior to scanning the first opening;
detecting, at a second time, a scanning trigger in the second scan area; and
when the second opening is blocked at the second time, repositioning the at least one moveable radio signal blocking component to unblock the second opening and block the first opening prior to scanning the second opening.

* * * * *

UNITED STATES PATENT AND TRADEMARK OFFICE
CERTIFICATE OF CORRECTION

PATENT NO. : 11,978,036 B2
APPLICATION NO. : 17/702609
DATED : May 7, 2024
INVENTOR(S) : Brad Matthew Johnson et al.

It is certified that error appears in the above-identified patent and that said Letters Patent is hereby corrected as shown below:

In the Specification

In Column 6, Line 58, delete "48," and insert -- 4B, --.

In Column 7, Line 35, delete "and or" and insert -- and/or --.

In Column 8, Line 36, delete "and or" and insert -- and/or --.

In Column 10, Line 62, delete "500." and insert -- 5. --.

Signed and Sealed this
Third Day of September, 2024

Katherine Kelly Vidal
Director of the United States Patent and Trademark Office